(12) United States Patent
Kerr

(10) Patent No.: US 11,928,433 B2
(45) Date of Patent: *Mar. 12, 2024

(54) SYSTEMS AND METHODS FOR TERM PREVALENCE-VOLUME BASED RELEVANCE

(71) Applicant: Richard Kerr, Farmers Branch, TX (US)

(72) Inventor: Richard Kerr, Farmers Branch, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/985,425

(22) Filed: Nov. 11, 2022

(65) Prior Publication Data

US 2023/0073243 A1    Mar. 9, 2023

Related U.S. Application Data

(63) Continuation of application No. 16/775,455, filed on Jan. 29, 2020, now Pat. No. 11,526,672.

(51) Int. Cl.
*G06F 40/284* (2020.01)
*G06F 16/14* (2019.01)
*G06F 16/22* (2019.01)

(52) U.S. Cl.
CPC .......... *G06F 40/284* (2020.01); *G06F 16/148* (2019.01); *G06F 16/2237* (2019.01)

(58) Field of Classification Search
None
See application file for complete search history.

(56) References Cited

U.S. PATENT DOCUMENTS

| | | | |
|---|---|---|---|
| 8,117,075 B1 | 2/2012 | Linden | |
| 8,166,203 B1 | 4/2012 | Yang | |
| 8,396,865 B1 | 3/2013 | Ie et al. | |
| 8,849,649 B2 | 9/2014 | Duong-van | |
| 10,255,283 B1 | 4/2019 | Cheng et al. | |
| 10,387,915 B2 | 8/2019 | Griesmeyer | |
| 11,048,759 B1 | 6/2021 | Pope et al. | |
| 2012/0310915 A1 | 12/2012 | Yang | |
| 2014/0229474 A1 | 8/2014 | Or et al. | |
| 2015/0227515 A1 | 8/2015 | Sennhauser et al. | |
| 2015/0310115 A1 | 10/2015 | Ryger et al. | |
| 2015/0317320 A1 | 11/2015 | Miller et al. | |

(Continued)

*Primary Examiner* — Howard Cortes
(74) *Attorney, Agent, or Firm* — MARSHALL, GERSTEIN & BORUN LLP

(57) ABSTRACT

Techniques for prevalence-volume based relevance are provided. Corresponding systems and methods may include ingesting a corpus of documents; receiving a search operator; segmenting the corpus of documents into (i) a first set of documents that matches the search operator, and (ii) a second set of documents that do not match the search operator; extracting a first and second token list of tokens; calculating a prevalence-volume value for tokens included in the first and second token lists; generating a prevalence-volume ratio (PVR) matrix that associates tokens included in the first and/or second token lists with a PVR value, wherein the PVR value for a particular token is a ratio between the prevalence-volume value of the particular token for the first set of documents and the prevalence-volume value of the particular token for the second set of documents; and associating the search operator with the generated PVR matrix.

20 Claims, 7 Drawing Sheets

(56) References Cited

U.S. PATENT DOCUMENTS

| | | |
|---|---|---|
| 2018/0052932 A1 | 2/2018 | Catalano et al. |
| 2018/0189307 A1 | 7/2018 | Yu et al. |
| 2018/0285449 A1 | 10/2018 | Baughman et al. |
| 2019/0318009 A1 | 10/2019 | Miller et al. |
| 2021/0073737 A1* | 3/2021 | Flynn ........................ G06N 5/04 |

* cited by examiner $$PVR_i = \frac{prevalence_{i\text{-}in} * volume_{i\text{-}in}}{prevalence_{i\text{-}out} * volume_{i\text{-}out}}$$

$$\text{Tokens } [T_{in}] \begin{bmatrix} token_1, & prevalence_1, & volume_1 \\ token_2, & prevalence_2, & volume_2 \\ token_n, & prevalence_n, & volume_n \end{bmatrix}$$

242

$$\text{Tokens } [T_{PVR}] \begin{bmatrix} token_1, & PVR_1 \\ token_2, & PVR_2 \\ token_i, & PVR_i \end{bmatrix}$$

250

$$\text{Tokens } [T_{out}] \begin{bmatrix} token_1, & prevalence_1, & volume_1 \\ token_2, & prevalence_2, & volume_2 \\ token_m, & prevalence_m, & volume_m \end{bmatrix}$$

SYSTEMS AND METHODS FOR TERM PREVALENCE-VOLUME BASED RELEVANCE

CROSS-REFERENCE TO RELATED APPLICATIONS

This application is a continuation of U.S. patent application Ser. No. 16/775,455 filed on Jan. 29, 2020 and entitled "Systems and Methods for Term Prevalence-Volume Based Relevance," the entire disclosure of which is hereby incorporated by reference.

FIELD OF THE DISCLOSURE

The present application relates generally to using term prevalence and term volume to develop a relevance metric and, more particularly, for generating a relevance metric based upon a prevalence-volume ratio for terms within particular segments of a corpus of documents.

BACKGROUND

Latent Semantic Indexing (LSI) involves applying natural language processing of documents to derive meaning from the terms included in the documents and/or corpus of documents. One way that is commonly used to determine relevance of a document is to apply term frequency*inverse document frequency (TF-IDF) techniques to the document. That is, relevance with respect to a document scored based upon how often the terms included in the document appear in the document itself as compared to the number of documents in which the term appears. As a result, documents that have a large number of relatively unique terms in common have higher relevance scores with respect to one another. Accordingly, TF-IDF is a useful technique to determine a relational relevance between documents.

However, in some scenarios, a person may prefer to identify a segment of the corpus and/or the terms most relevant therewith. For example, if a person is conducting a search of a job listing database for an accountant position, the person may want to know the most relevant terms in accounting postings so that the person may ensure that his or her resume includes those words. Similarly, the person may want to determine a job title most strongly associated with his or her resume to ensure it aligns with a desired job title. In this scenario, while TF-IDF can identify the most relevant job posting, it does not segment the corpus to be able to provide these segment-based insights. Accordingly, there is a need for systems and methods of providing a term prevalence-volume based relevance metric.

SUMMARY

In an embodiment, a computer-implemented method is provided. The method includes (1) ingesting, via one or more processors, a corpus of documents; (2) receiving, via the one or more processors, a search operator; (3) segmenting, via the one or more processors, the corpus of documents into (i) a first set of documents that matches the search operator, and (ii) a second set of documents that do not match the search operator; (4) extracting, via the one or more processors, (i) a first token list of tokens included in the first set of documents and (ii) a second token list of tokens included in the second set of documents; (5) calculating, via the one or more processors, a prevalence-volume value for tokens included in the first and second token lists; (6) based on the calculated prevalence-volume values, generating, via the one or more processors, a prevalence-volume ratio (PVR) matrix wherein the PVR matrix associates tokens included in the first and/or second token lists with a PVR value, wherein the PVR value for a particular token is a ratio between the calculated prevalence-volume value of the particular token for the first set of documents and the calculated prevalence-volume value of the particular token for the second set of documents; and (7) associating, via the one or more processors, the search operator with the generated PVR matrix.

In another embodiment, a system is provided. The system includes (a) one or more processors; and (b) one or more non-transitory memories coupled to the one or more processors and storing processor-executable instructions thereon. The instructions, when executed by the one or more processors, cause the system to (1) ingest a corpus of documents; (2) receive a search operator; (3) segment the corpus of documents into (i) a first set of documents that matches the search operator, and (ii) a second set of documents that do not match the search operator; (4) extract (i) a first token list of tokens included in the first set of documents and (ii) a second token list of tokens included in the second set of documents; (5) calculate a prevalence-volume value for tokens included in the first and second token lists; (6) based on the calculated prevalence-volume values, generate a prevalence-volume ratio (PVR) matrix wherein the PVR matrix associates tokens included in the first and/or second token lists with a PVR value, wherein the PVR value for a particular token is a ratio between the calculated prevalence-volume value of the particular token for the first set of documents and the calculated prevalence-volume value of the particular token for the second set of documents; and (7) associate the search operator with the generated PVR matrix.

BRIEF DESCRIPTION OF THE DRAWINGS

FIGS. 4 and 5 are processed performed by the search platform of FIG. 1 for determining prevalence-volume metrics based on the segmentation process of FIG. 3, in accordance with an example embodiment;

FIG. 5 is an process performed by the search platform of FIG. 1 for calculating a prevalence-volume ratio based on the segmentation process of FIG. 3, in accordance with an example embodiment;

DETAILED DESCRIPTION

As generally used herein, the term "prevalence-volume ratio" or "PVR" of a term refers to a ratio of prevalence-volume (PV) metric for the term in a segment of interest or "in group" as compared the remaining documents in the corpus of documents or "out group". As described in more detail below, the PV metric may be a product of the term prevalence (the number of documents in which the term appears within the in/out group) and the term volume (the number of times the term appears within the in/out group). Additionally, as generally used herein, the PVR score for a document refers to the sum of the PVR values for the tokens included in a token list corresponding to the document. Generally speaking, the higher the PVR score is for a document using a PVR matrix associated with a particular category, the more likely the document is to be included in that category (e.g., the document is more relevant to that category).

Figure 1:
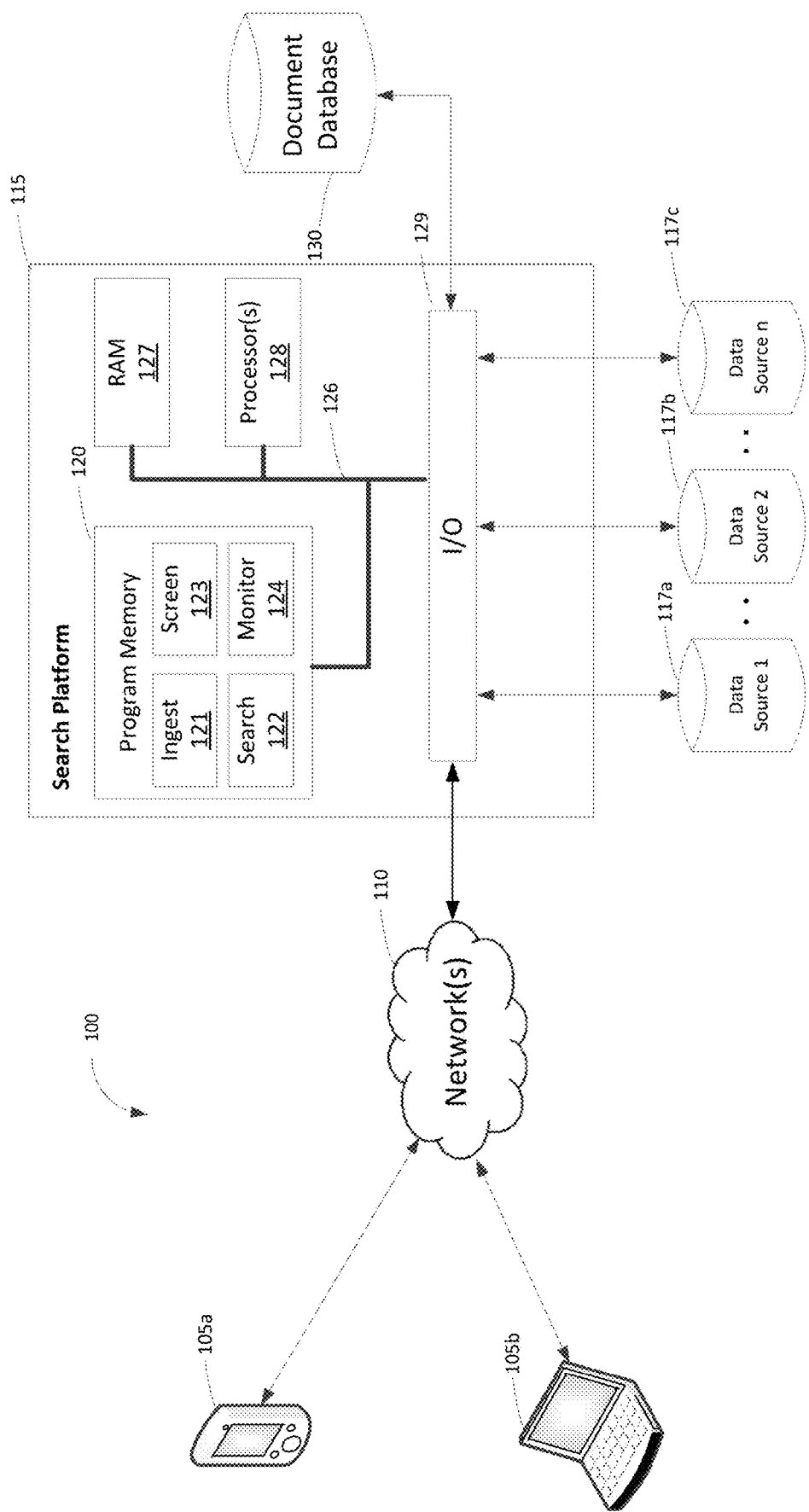
FIG. 1 is a block diagram of an example environment that includes a search platform configured to execute the prevalence-volume based relevance techniques described herein.

FIG. 1 illustrates an example environment 100 that includes a search platform 115 configured to support query operations of the document database 130. The document database 130 may utilize any known database architecture. For example, in some embodiments, the document database 130 is a distributed file system, such as a cloud storage solution. Accordingly, the search platform 115 may be configured to act as an interface between the document database 130 and end users. Similarly, while FIG. 1 illustrates that search platform 115 as a single entity, in other embodiments, the search platform 115 may be multiple entities acting in conjunction with one another. For example, in some embodiments, the search platform 115 is implemented in a distributed computing environment, such as a cloud computing environment.

In the example environment 100, end users interact with a client device 105, such as mobile phone 105a, laptop computer 105b, a tablet, a smart wearable device (e.g., smart glasses, a smart watch), a home personal assistance device, or any other electronic device that is normally used to access internet-based content. The client devices 105 are communicatively coupled to the search platform 115 via one or more wired or wireless networks 110 that facilitate any type of data communication via any current or future-developed standard or technology (e.g., GSM, CDMA, TDMA, WCDMA, LTE, EDGE, OFDM, GPRS, EV-DO, UWB, IEEE 802 including Ethernet and Wi-Fi, WiMAX, Bluetooth, and others). Although FIG. 1 only illustrates two client devices 105, the environment 100 may include any number of client devices 105.

The search platform 115 includes one or more processors 128 configured to execute instructions that form the various applications, modules, and other components of the search platform 115 described herein. In cloud computing embodiments, the processors 128 may be physically located in different hardware entities (e.g., servers) while still being logically connected to execute the various tasks described herein. The processors 128 may include central processing units (CPUs), graphics processing units (GPUs), application-specific integrated circuits (ASICS), and/or any other types of computer processors. While the disclosure may generally refer to the processors 128 executing the various tasks described herein, particular tasks may be better suited to one type of processor. For example, the repetitive analysis associated with some operations described herein may be more efficiently executed by GPUs than CPUs. Accordingly, in embodiments that include multiple types of processors, the search platform 115 may utilize a particular type of processor to execute instructions that are more efficiently executed by the particular type of processor.

In the illustrated embodiment, the search platform 115 also includes a program memory 120, a random-access memory (RAM) 127, and an input/output (I/O) circuit 129, all of which may be interconnected via an address/data bus 126. It should be appreciated the memory of the search platform 115 may include multiple RAMs 127 and multiple program memories 120 implemented as any type of memory, such as semiconductor memory, magnetically readable memory, or optically readable memory, for example. Similarly, although the I/O circuit 129 is shown as a single block, it should be appreciated that the I/O circuit 129 may include a number of different types of I/O circuits. For example, the I/O block 129 may include one or more transceiver circuits to facilitate communications over the networks 110 and/or directly with data sources.

The program memory 120 may store any number of applications, routines, tools, or other collections of computer-readable instructions that support the analytics techniques described herein. For example, the program memory 120 may include an ingestion application 121 configured to ingest documents into the document database 130, a search application 122 configured to support queries of the document database 130, a screening application 123 configured to provide resume (or other document) screening functionality that utilizes documents stored at the document database 130 as a baseline, and/or a monitoring application 124 configured to monitor drifts in term usage for periodically generated, filed, and/or published documents. Of course, other applications that leverage the disclosed PVR analysis techniques may be stored at the program memory 120.

As illustrated, the search platform 115 is connected to a plurality of data sources 117 that provide documents that are ingested into the document database 130. For example, a first data source 117a may be a job postings database hosted by an third-party provider (e.g., monster.com or indeed.com). In this example, the third party provider maintains the data source 117a. As another example, the data source 117b may be a database of public records that are periodically filed (e.g., the EDGAR system maintained by the SEC). Although FIG. 1 illustrates the search platform 115 being connected to three data sources 117, the search platform 115 may be connected to any number or combination of data sources 117.

In some embodiments, the ingestion application 121 is configured to monitor the data sources 117 to identify documents to ingest into the document database 130. For some data sources 117, the data source 117 corresponds to a public application programming interface (API) which the ingestion application 121 can utilize to identify and/or obtain documents. In some scenarios, the API includes the ability to subscribe to a data feed of documents that are automatically pushed to the search platform 115. Accordingly, the ingestion application 121 may be configured to transmit API calls to these data sources 117 via the I/O circuit 129. For other data sources 117, the ingestion application 121 utilizes a web scraper to generate documents based upon the text that is displayed on a web page.

Figure 2:
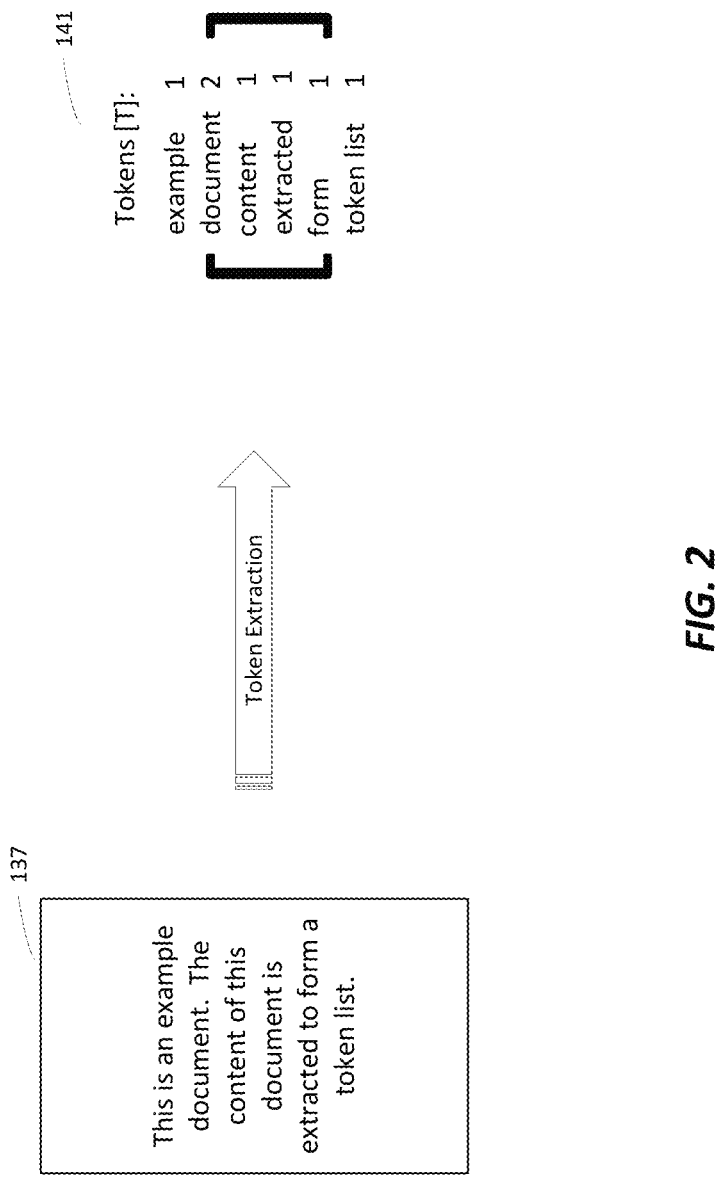
FIG. 2 is an tokenization process performed by the search platform of FIG. 1, in accordance with an example embodiment.

Upon obtaining documents from the data sources 117, the ingestion application 121 processes the documents for storage at the document database 130. With simultaneous reference to FIG. 2, illustrated is an example tokenization process performed by the ingestion application 121 of the search platform 113.

As part of this processing, the ingestion application 121 may normalize the text (e.g., delete punctuation, formatting characters, lower case each word, and so on), remove any stop words (e.g., a list of words that are generally not useful in perform natural language processing, such as "by", "and", "so", etc.) and tokenize the remaining text to produce tokens (e.g., words, bi-grams, and/or tri-grams) found in the document. The ingestion application 121 may also apply other exclusion rules to the tokens. For example, the ingestion application 121 may apply user-defined blacklists, filter out lengthy tokens, and/or apply a filter that only keeps tokens identified as verbs, adverbs, nouns, or adjectives. For each of the remaining tokens, the ingestion application 121 may determine a local frequency (i.e., the number of time that the token appeared in the document). Accordingly, the ingestion application 121 may be configured associate ingested documents with a corresponding token list that includes the local frequency data. In the example depicted in FIG. 2, the ingestion application 121 ingests the document 137 by producing the token list 141 and the respective local frequencies. In some embodiments, the document database 130 stores the token list 141 as a relational table associated with the document 137.

A second application stored in the program memory 120 is a search application 122 configured to identify tokens associated with a search operator. For example, a user conducting a job search may utilize the client devices 105 to send a search operator indicative of a particular job title. Using the disclosed PVR analysis techniques, the search application 122 is configured to provide the user a list of terms most strongly correlated with the job indicated by the search operator. Based on these results, the user can then revise his or her resume to use the terms that more closely align with those associated with the desired job title.

A third application stored in the program memory 120 is a screening application 123 configured to identify documents most closely correlated to a particular category of documents based on the disclosed PVR analysis techniques. For example, an employer looking to fill a position may provide the search platform 115 a job description. Based on the provided information, the screening application 123 may generate a PVR matrix using the below-described techniques. For example, the search platform may perform clustering and/or latent semantic indexing (LSI) techniques to identify a segment associated with the job description. In an alternate example, the employer selects a predefined job title already associated with a PVR matrix. In either event, using the determined PVR matrix, the screening application 123 then analyzes a plurality of ingested resumes to assign the resumes a PVR score. The screening application 123 may then sort and/or filter the corpus of resumes based on the resume PVR scores to identify the resumes that most closely align with the job description and/or selected job title.

A fourth application stored in the program memory 120 is a monitoring application 124 configured to identify a shift in terminology in a document generated on a periodic basis. For example, a shift in terminology in an SEC 10-K filing may indicate that a company is changing business strategies which, in turn, may signal to portfolio managers that their prior analyses regarding the company should be reviewed. Accordingly, the monitoring application 124 may be configured to generate a PVR matrix based on a certain number of previously-generated documents by that company. For example, the PVR matrix may be generated based on the previous generated document, the last four previously generated documents, all of the previously generated documents since a previously detected shift in document PVR scores, or all previously-generated documents. Accordingly, the monitoring application 124 may be configured to compare the PVR score for the most recently generated document to the prior documents to determine a percentage by which the PVR score changed. In some embodiments, the monitoring application 124 is automatically executed when a new periodically-generated document is ingested via the ingestion application 121.

It should be appreciated that while the example search platform 115 includes each of the ingestion application 121, the search application 122, the screening application 123, and the monitoring application 124 in the program memory 120, other embodiments may include additional or fewer applications in the program memory 120. Additionally, while the functionality of the applications 121-124 is generally described herein as being performed by the search platform 115, in some embodiments, the client device 105 includes a companion application executing thereon. Accordingly, in these embodiments, some of the functions described with respect to the applications 121-124 may be performed locally at the client device 105 in conjunction with the search platform 115.

Figure 3:
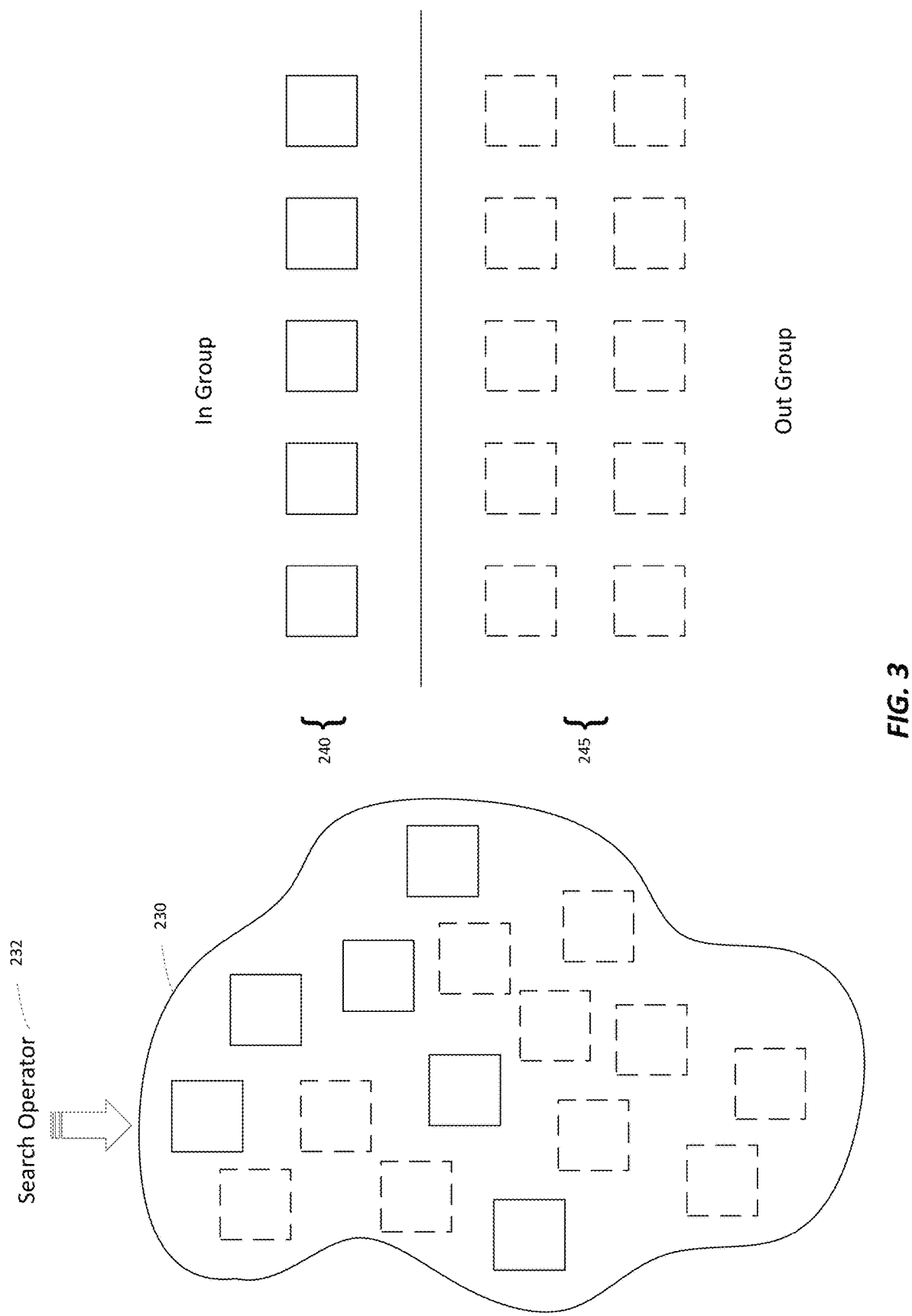
FIG. 3 is an segmentation process performed by the search platform of FIG. 1, in accordance with an example embodiment.

Turning now to FIG. 3, illustrated is an example representation of a search platform (such as the search platform 115 of FIG. 1) segmenting a corpus of documents 230 (such as the documents stored at the document database 130) based upon a search operator 232. For example, the search application 122 and/or the screening application 123 may be configured to provide a job title as the search operator 232. As another example, the monitoring application 124 may be configured to provide a company name and/or a particular document associated with a company as the search operator 232. Keywords and/or other types of metadata can also be provided as the search operator 232. Using the search operator 232, the search platform defines a first set of documents 240 that matches the search operator (the "In Group") and a second set of documents 245 that does not match the search operator (the "Out Group"). It should be appreciated that the search operator based matching generally relates to matching a field of metadata associated with the document (e.g., a job title, a company name, a document type, an author, keywords, name of a cluster to which the document belongs, and/or other types of metadata associated with documents in the corpus of documents 230) and not the category-based relevance that is determined using the PVR matrix.

In some embodiments, the search platform implements one or more techniques to detect near matches for inclusion in the In Group 240. For example, the search platform may use name normalization techniques to identify related companies. As another example, the search platform may include a dictionary of synonyms and/or common misspellings. As still further examples, the search platform may implement one or more semantic analyses on the metadata fields to identify closely related search operators for inclusion in the In Group 240.

Figure 4:
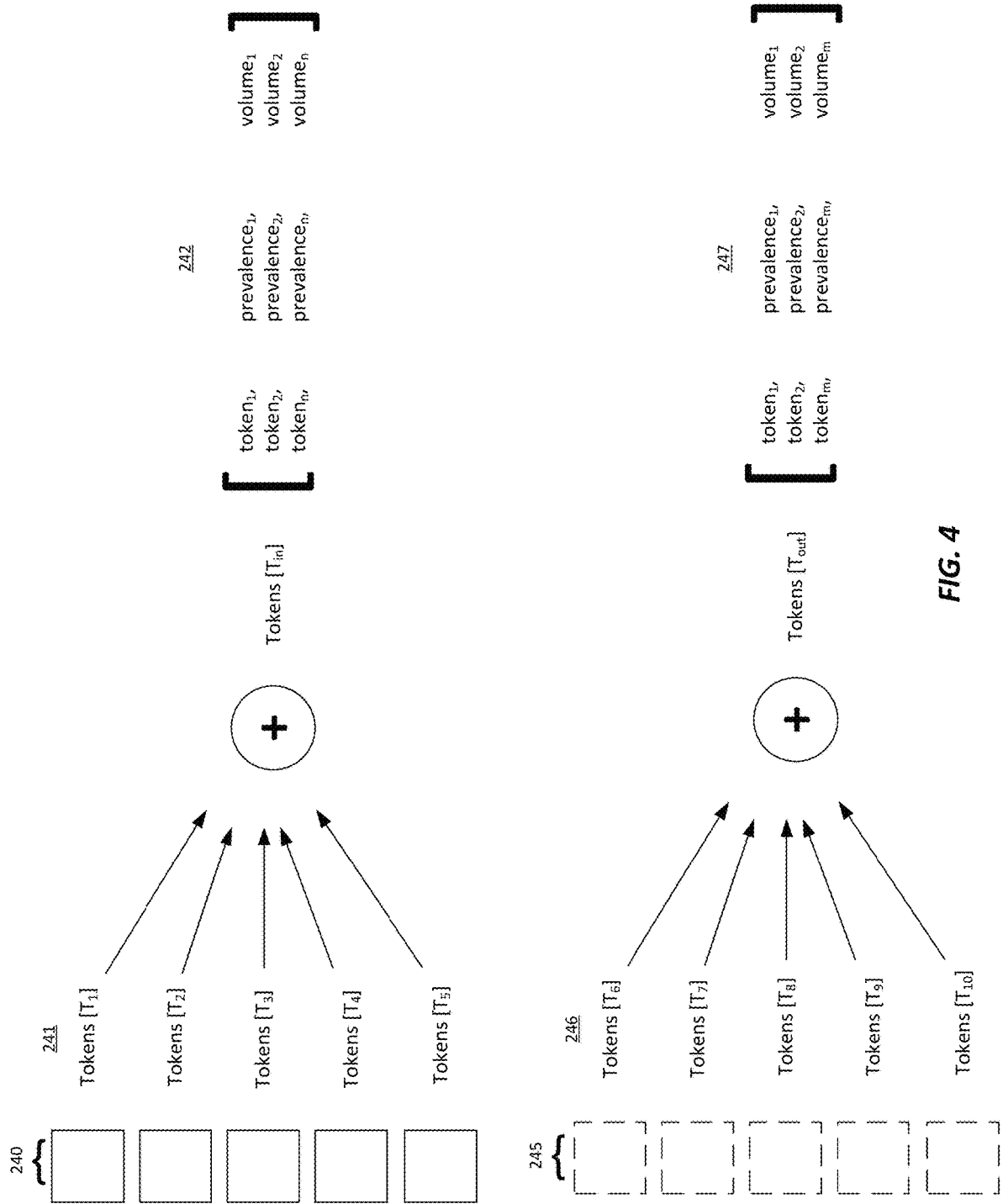

Turning now to FIG. 4, illustrated is an example representation of a search platform (such as the search platform 115 of FIG. 1) calculating the Prevalence-Volume (PV) scores for each token included in the In Group 240 and the Out Group 245. As illustrated, the search platform obtains the token list 241 associated with each of the documents within the In Group 240 (e.g., by accessing the relational data table associated with the particular document) to create a composite token list 242 for the In Group 240. It should be appreciated that if a token is included in multiple token lists 241, only a single copy of the token may appear in the token list 242. Similarly, the search platform may be configured to combine the token lists 246 for the Out Group 245 into the composite token list 247.

After compiling the composite token lists 242 and 247, the search platform may calculate a prevalence value and a volume value for each token included therein. To calculate the prevalence value for a particular token, the search platform may divide the number of documents within the In Group 240/Out Group 245 in which the particular token appears by the total number of documents within the In Group 240/Out Group 245. To calculate the volume value for a particular token, the search platform may divide the sum of the local frequencies for the token within documents in the In Group 240/Out Group 245 by the total number of documents within the In Group 240/Out Group 245.

Turning now to FIG. 5, illustrated is an example representation of a search platform (such as the search platform 115 of FIG. 1) calculating the PVR values for each token included in the In Group 240 and the Out Group 245. To this end, the search platform may be configured to combine the composite token lists 242 and 247 to produce a PVR matrix 250 for each token within the corpus of documents. Accordingly, the search platform may be configured to calculate a PVR value for each token in the corpus of documents. To calculate the PVR value, the search platform calculates the PV value (the prevalence value multiplied by the volume value) for the token within the In Group 240 and the Out Group 245. The ratio of these two values is the PVR score for the token. If the token is only included in the In Group 240, to avoid dividing by 0, the search platform may set the PVR value to be some value greater than or equal to the highest PVR value in the PVR matrix 250. In some embodiments, to reduce the computation time when using the PVR matrix 250 to determine a PVR score for a particular document, the search platform may delete tokens from the PVR matrix 250 that have a PVR value below a threshold value (e.g., 5, 10, 20, etc.). Accordingly, only the tokens that are most informative of whether or not the particular document corresponds to the In Group 240 are utilized.

Figure 6:
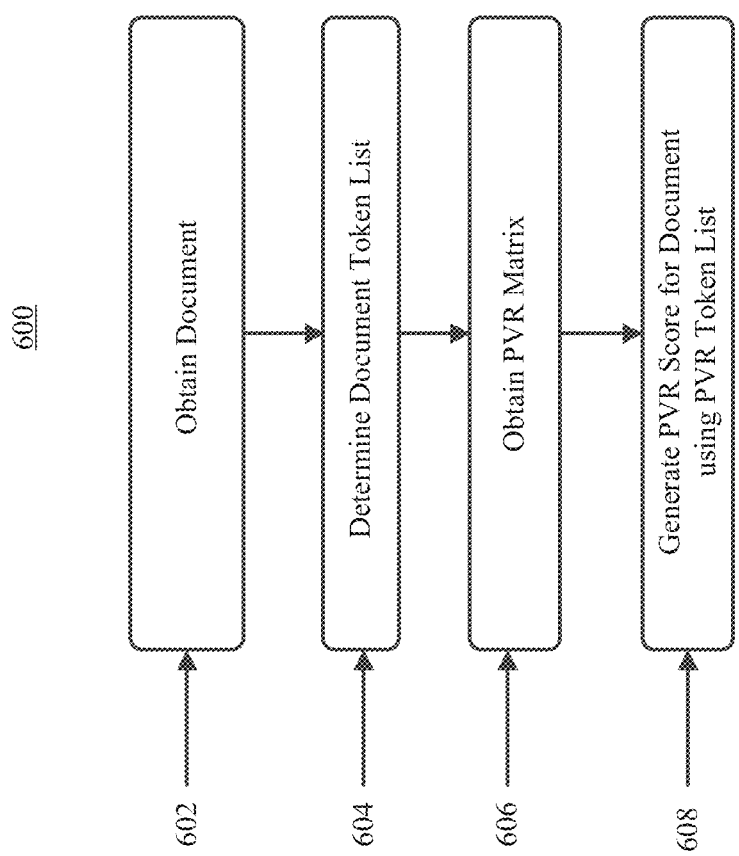
FIG. 6 is an example flow diagram of an example method for determining a prevalence-volume ratio score for a document based on the processes of FIGS. 2-5, in accordance with an example embodiment.

Turning to FIG. 6, illustrated is an example flow diagram of an example method 600 for determining a prevalence-volume ratio score for a document based on the processes of FIGS. 2-5. The method 600 may be performed by a search platform (such as the search platform 115 of FIG. 1).

At block 602, the search platform obtains a document. In some scenarios, the obtained document is a user-uploaded document. For example, the search application 122 may obtain a user uploaded resume to determine a PVR score the resume. As another example, the screening application 124 may obtain one or more applicant-uploaded resumes to determine a PVR score for each resume associated with a job posting. In other scenarios, the obtained document has been ingested by the ingestion application 121. For example, the monitoring application 125 may obtain a new periodically-generated document to generate a PVR score for that document.

At block 604, the search platform determines a document token list for the obtained document. If the document has been previously ingested, the document token list may be obtained from a document database (such as the document database 130 of FIG. 1). Otherwise, the search platform may perform the techniques described with respect to FIG. 2 to generate a document token list for the obtained document.

At block 606, the search platform obtains a PVR matrix. For example, the PVR token list may be generated in a similar manner as described by the processes described with respect to FIGS. 2-5 to generate the PVR matrix 250. In some embodiments, the search platform includes a database of PVR matrices associated with respective categories of documents within the corpus of documents. In these embodiments, a search operator provided by the user may be used to query the PVR matrix database to obtain the PVR matrix associated with the search operator rather than initiating the segmentation of the corpus of document based upon the search operator, as described by FIG. 3.

At block 608, the search platform generates the PVR score for the obtained document using the obtained PVR matrix. To generate the PVR score, the search platform identifies each token within the document token list and queries the PVR matrix to determine the corresponding PVR value associated with the token. The search platform then sums the obtained PVR values for each token within the document token list to obtain the PVR score for the document. It should be appreciated that the higher the PVR score, the more strongly the document is associated with document category from which the PVR matrix is generated.

In some embodiments, the search platform may be configured to generate a plurality of PVR matrices for a plurality of In Groups defined using different search operators. For example, the ingestion application 121 may be configured to associate each document with one of a pre-defined list of possible options for a searchable field of metadata. Accordingly, the search platform may be configured to define respective In Groups and Out Groups with respect to each of the pre-defined options. In these embodiments, the search platform may associate each of the pre-defined options with respective PVR matrices for storage in the PVR matrix database. Accordingly, the search platform may generate the PVR score for the obtained document using a plurality of different PVR matrices using the actions described with respect to block 606 and 608 for a plurality of different PVR matrices. The search platform may then generate a ranked list of categories based upon the PVR scores generated using the category's respective PVR matrix.

In one example, the ranked list indicates to a user which job categories their resume is most closely aligned. In some embodiments, the search platform normalizes the PVR scores to a scale that is more readily understandable by end users (such as 0-100%, 0-5 stars, and so on). Additionally, in some embodiments, each indication of job category is associated with a list of tokens associated with the highest PVR values for that job category. For example, the list of tokens may be presented in conjunction with the ranked list and/or in response to a user interaction with an interface element associated with the job category. By presenting the list of tokens associated with the job categories, the end user is provided direction on how to modify his or her resume to more closely align with a desired job category.

Figure 7:
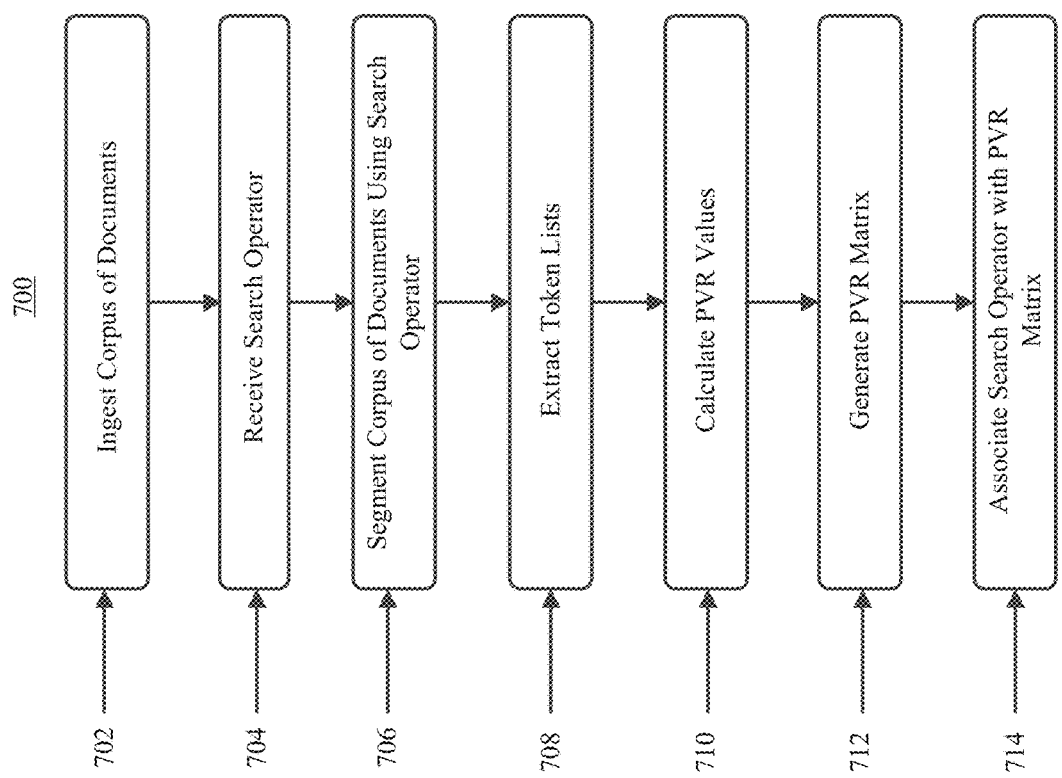
FIG. 7 is an example flow diagram of an example method for generating a prevalence-volume ratio matrix based upon a search operator, in accordance with an example embodiment.

Turning to FIG. 7, illustrated is an example flow diagram of an example method 700 for generating a PVR matrix (such as the PVR matrix 250 of FIG. 5). The method 700 may be performed by a search platform (such as the search platform 115 of FIG. 1), and, more particularly, by one or more processors of the search platform executing one more applications stored in a memory thereat.

At block 702, the search platform ingests a corpus of documents. In some embodiments, the search platform obtains the documents for ingestion from one or more third party databases (such as the databases 117 of FIG. 1). For some third party data sources, the search platform may implement web scraping techniques to generate the documents. After obtaining the documents, an ingestion application executing at the search platform may process the documents for storage at a database (such as the document database 130 of FIG. 1). In some embodiments, the ingestion application associates the ingested documents with a token list and one or more searchable fields of metadata using the techniques described with respect to FIG. 2. To this end, the search platform may be configured to exclude particular tokens from the token list based on one or more exclusion criteria (e.g., stop words, token length, part of speech, blacklists, character type, and so on).

At block 704, the search platform receives a search operator. In some embodiments, the search operator is provided by a user interacting with a client device (such as the client devices 105 of FIG. 1). More particularly, the client device may be configured to present a user interface that interfaces with a website and/or a dedicated application executing thereon associated with one or more search functions supported by the search platform (such as those described with respect to the search application 122, the screening application 123, and the monitoring application 124 of FIG. 1).

In other embodiments, the ingestion application may provide the search operator. For example, as part of the ingestion process, the ingestion application may detect that a threshold number of documents associated with a particular document category were ingested. Accordingly, an existing PVR matrix associated with the category may no longer reflect the PVR of that segment of the corpus. In this example, the ingestion application may trigger the search platform to generate a new PVR matrix for that category (e.g., by using that category name as the search operator). As another example, as part of the ingestion process, the ingestion application may perform one or more clustering techniques. In this example, the ingestion application may detect that a new cluster has formed. Accordingly, the ingestion application may associate documents within that cluster with a new category and then generate a PVR matrix for the new category (e.g., by using the new category name as the search operator).

At block 706, the search platform segments the corpus of documents into (i) a first set of documents that matches the search operator, and (ii) a second set of documents that do not match the search operator. For example, the search platform may perform the techniques described with respect to FIG. 3. In this example, the first set of documents may form the In Group 240 and the second set of documents may form the Out Group 245.

At block 708, the search platform extracts (i) a first token list of tokens included in the first set of documents and (ii) a second token list of tokens included in the second set of documents. At block 710, the search platform calculates a prevalence-volume value for tokens included in the first and second token lists. To perform the actions associated with block 708 and 710, the search platform may perform the techniques described with respect to FIG. 4. In this example, the first token list and the corresponding PV values may be the token list 242 and the second token list and the corresponding PV values may be the token list 247.

At block 712, based on the calculated prevalence-volume values, the search platform generates a prevalence-volume ratio (PVR) matrix. The PVR matrix associates tokens included in the first and/or second token lists with a PVR value. To this end, the PVR value for a particular token is a ratio between the calculated PV value of the particular token for the first set of documents and the calculated PV value of the particular token for the second set of documents. For example, the search platform may perform the techniques described with respect to FIG. 5 to generate the PVR matrix. In this example, the generated PVR matrix may be the PVR matrix 250.

In some embodiments, the search platform performs the functions associated with blocks 706-712 with a plurality of search operators. That is, the search platform may be configured to use a second search operator (e.g., a second category of documents as defined by a field of metadata associated with the documents) to segment the corpus into a third and fourth sets of documents, wherein documents in the third set of documents match the second search operator. It should be appreciated that in some embodiments, documents included in the first set of documents are also included in the fourth set of documents. Similarly, documents included in the second set of documents may also be included in the third set of documents.

At block 714, the search platform associates the search operator with the generated PVR matrix. For example, the search platform may include a PVR matrix database that stores data tables associated with different segments of the corpus documents (e.g., documents that form an In Group using a particular search operator). Accordingly, associating the search operator with the generated PVR matrix may include updating and/or creating a data table associated with the search operator in the PVR matrix database to indicate the generated PVR matrix.

By associating the PVR matrix with the search operator, the search platform may support various forms of user feedback. As one form of feedback associated with the search application 122, the search platform may transmit a list of tokens associated with high PVR scores (e.g., the top five PVR scores) in the PVR matrix to the client device for presentation thereat. As another form of feedback supported by some embodiments of the search application 122 is an indication of a segment of the corpus of the documents to which the a user-uploaded document is most closely associated (e.g., an indication of a job title most closely associated with an uploaded resume). In this example, the search platform may generate a PVR score for the user-uploaded document using a plurality of PVR matrices stored at the PVR matrix database (such as by performing the method 600 of FIG. 6). Accordingly, the search platform may transmit a ranked list of document categories (e.g., job titles) to the client device for presentation thereat.

As another example user feedback associated with the screening application 123, the search platform may determine whether one or more user-submitted documents (e.g., applicant resumes) exceeds a threshold PVR score. For example, an employer may provide a search operator to the search platform related to an open position (e.g., a job title or description). The search platform may then use the generated PVR matrix to generate PVR scores for applicant resumes. To perform the initial screen, the search platform may identify a PVR score cutoff (either automatically or based on employer-input) and provide an indication of whether or not documents that exceed the threshold. As a result, the search platform can filter out resumes that are not particularly relevant to the open position.

As yet another example user feedback associated with the monitoring application 124, the search platform may determine whether the PVR score for a new periodically-generated document of a particular type (e.g., a particular company's SEC 10-K filings) changed a threshold amount from prior documents of the particular type. In this example, the search operator may be indicative of the particular type of document (e.g., a company name and/or type of filing). Accordingly, using the generated PVR matrix, the search platform may generate a PVR score for both the new document and one or more prior documents of the particular type. If the PVR scores are different by a threshold amount (e.g., 10%, 25%, etc.), the search platform may generate an alert or other indication that there is a shift in term usage for the particular type of document. Because a shift in term usage is correlated to a shift in operational strategy, an investment professional can be alerted to investigate the particular company to identify potential opportunities based on the detected shift in operation strategy.

Additionally, when implemented in software, any of the applications and tools described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof.

What is claimed:

1. A computer-implemented method comprising:
   ingesting, via one or more processors, a corpus of documents;
   receiving, via the one or more processors, a plurality of search operators associated with respective job categories;
   for search operators in the plurality of search operators:
   segmenting, via the one or more processors, the corpus of documents into (i) a first set of documents that matches the search operator, and (ii) a second set of documents that do not match the search operator,
   extracting, via the one or more processors, (i) a first token list of tokens included in the first set of documents and (ii) a second token list of tokens included in the second set of documents,
   calculating, via the one or more processors, a prevalence-volume value for tokens included in the first and second token lists,
   based on the calculated prevalence-volume values, generating, via the one or more processors, a prevalence-volume ratio (PVR) matrix wherein the PVR matrix associates tokens included in the first and/or second token lists with a PVR value, wherein the PVR value for a particular token is a ratio between the calculated prevalence-volume value of the particular token for the first set of documents and the calculated prevalence-volume value of the particular token for the second set of documents, and
   associating, via the one or more processors, the search operator with the generated PVR matrix;
   obtaining, via the one or more processors, a user-uploaded document;
   generating, via the one or more processors, a PVR score for the user-uploaded document using the PVR matrices for the plurality of search operators; and
   presenting, via the one or more processors, a ranked list of job categories based upon the generated PVR scores.

2. The computer-implemented method of claim 1, further comprising:
   transmitting, to a client device, an indication of tokens included in the PVR matrix.

3. The computer-implemented method of claim 1, wherein generating the PVR score for the user-uploaded document for a search operator in the plurality of search operators comprises:
   extracting, via the one or more processors, a document token list for the user uploaded-document;
   for tokens included in the document token list, obtaining, via the one or more processors, the corresponding PVR value from the PVR matrix for the search operator; and
   generating, via the one or more processors, PVR score for the user-uploaded document by summing the obtained PVR values for the tokens included in the document token list.

4. The computer-implemented method of claim 3, further comprising:
   determining, via the one or more processors, whether the PVR score for the user-uploaded document exceeds a threshold PVR score when applying the PVR matrix for the search operator; and
   presenting, via the one or more processors, an indication of whether the user-uploaded document exceeds the threshold PVR score for the search operator.

5. The computer-implemented method of claim 1, wherein the user-uploaded document is a resume.

6. The computer-implemented method of claim 1, wherein presenting the ranked list of job categories comprises:
   presenting, via the one or more processors, a normalized indication of the PVR score for the job categories included in the ranked list.

7. The computer-implemented method of claim 1, wherein generating the PVR matrix comprises:
   excluding, via the one or more processors, tokens that have a PVR value below a threshold PVR value from inclusion in the PVR matrix.

8. The computer-implemented method of claim 1, wherein receiving the plurality of search operators comprises:
   receiving, from a client device, the plurality of search operators.

9. The computer-implemented method of claim 1, wherein ingesting the corpus of documents comprises:
   scraping, via the one or more processors, a website or a third party database to generate the documents in the corpus of documents.

10. The computer-implemented method of claim 1, wherein extracting the token list comprises:
    excluding, via the one or more processors, words that meet one or more exclusion criteria.

11. A system comprising:
    one or more processors; and one or more non-transitory memories coupled to the one or more processors and storing processor-executable instructions thereon that, when executed by the one or more processors, cause the system to:
- ingest a corpus of documents;
- receive a plurality of search operators associated with respective job categories;
- for search operators in the plurality of search operators:
  - segment the corpus of documents into (i) a first set of documents that matches the search operator, and (ii) a second set of documents that do not match the search operator,
  - extract (i) a first token list of tokens included in the first set of documents and (ii) a second token list of tokens included in the second set of documents,
  - calculate a prevalence-volume value for tokens included in the first and second token lists,
  - based on the calculated prevalence-volume values, generate a prevalence-volume ratio (PVR) matrix wherein the PVR matrix associates tokens included in the first and/or second token lists with a PVR value, wherein the PVR value for a particular token is a ratio between the calculated prevalence-volume value of the particular token for the first set of documents and the calculated prevalence-volume value of the particular token for the second set of documents, and
  - associate the search operator with the generated PVR matrix;\
- obtain a user-uploaded document;
- generate a PVR score for the user-uploaded document using the PVR matrices for the plurality of search operators; and
- present a ranked list of job categories based upon the generated PVR scores.

12. The system of claim 11, wherein the instructions, when executed, cause the system to:
   transmit, to a client device, an indication of tokens included in the PVR matrix.

13. The system of claim 11, wherein to generate the PVR score for the user-uploaded document for a search operator in the plurality of search operators, the instructions, when executed, cause the system to:
   extract a document token list for the user uploaded-document;
   for tokens included in the document token list, obtain the corresponding PVR value from the PVR matrix for the search operator; and
   generate PVR score for the user-uploaded document by summing the obtained PVR values for the tokens included in the document token list.

14. The system of claim 13, wherein the instructions, when executed, cause the system to:
   determine whether the PVR score for the user-uploaded document exceeds a threshold PVR score when applying the PVR matrix for the search operator; and
   present an indication of whether the user-uploaded document exceeds the threshold PVR score for the search operator.

15. The system of claim 11, wherein the user-uploaded document is a resume.

16. The system of claim 11, wherein to present the ranked list of job categories, the instructions, when executed, cause the system to:
   present a normalized indication of the PVR score for the job categories included in the ranked list.

17. The system of claim 11, wherein to generate the PVR matrix, the instructions, when executed, cause the system to:
   exclude tokens that have a PVR value below a threshold PVR value from inclusion in the PVR matrix.

18. The system of claim 11, wherein to receive the plurality of search operators, the instructions, when executed, cause the system to:
   receive, from a client device, the plurality of search operators.

19. The system of claim 11, wherein to ingest the corpus of documents, the instructions, when executed, cause the system to:
   scrape a website or a third party database to generate the documents in the corpus of documents.

20. The system of claim 11, wherein to extract the token list, the instructions, when executed, cause the system to:
   exclude words that meet one or more exclusion criteria.

* * * * *